United States Patent [19]

Harris et al.

[11] 4,181,021

[45] Jan. 1, 1980

[54] POSITION TRANSMITTER

[75] Inventors: Lewis K. Harris; Howard J. Pearse, both of Tulsa, Okla.

[73] Assignee: Combustion Engineering, Inc., Windsor, Conn.

[21] Appl. No.: 906,492

[22] Filed: Jul. 28, 1978

[51] Int. Cl.² ............................................. G01F 23/06
[52] U.S. Cl. .................................................... 73/317
[58] Field of Search ................ 73/317, 318, 305–316, 73/716–722; 277/30

[56] References Cited

U.S. PATENT DOCUMENTS

| 2,985,020 | 5/1961 | Fisher | 73/716 |
| 3,382,719 | 5/1968 | Villeneuve | 73/305 |

*Primary Examiner*—Donald O. Woodiel
*Attorney, Agent, or Firm*—Arthur L. Wade

[57] ABSTRACT

A displacer body is linked to a position transmitter of an analogue signal through an elastomeric body mounted in the wall of the vessel in which the displacement takes place.

4 Claims, 5 Drawing Figures

POSITION TRANSMITTER

BACKGROUND OF THE INVENTION

One of the present systems for detecting and manifesting positions is called the flex tube. This device was developed scores of years ago. The basic disclosure can be traced in Canadian Pat. No. 440,647 issued May 7, 1957 to C. O. Glasgow. Essentially, this prior art is a tube fixed at one end relative to the wall of a vessel and extending into the vessel interior. The "free" end of this tube is sealed about a rod which extends axially inside the tube to outside the vessel while the internal end of the rod extends beyond the end of the tube to a displacer whose movement is sensed by this mechanism. The displacer usually is moved by a fluid level in the vessel. Linked to the tube, the rod bends-flexes the tube from its connection to the vessel wall. Somewhere along the length of the tube is located the fulcrum of the rod. The bottom line is that the rod is pivoted about its fulcrum by the displacer, the other end of the rod being pivoted over a range of movement external to the vessel. A signal, or control, device is actuated by the external rod end to establish an analogue of the variable condition moving the displacer.

In being flexed, the tube provides the return force on the displacer. Within its range short of its yield point, the tube provides a base position for the rod as a link between the displacer and signal device. Further, the seal between the rod and tube provides a seal of the vessel through which the displacer motion is transmitted to the outside of the vessel.

As simple as the flex tube is, its parts include the elongated tube and the sealing connections it has at each end to the rod and vessel wall. A more simple structure to support the rod and apply a centralizing force should be provided. Surely present-day technology can provide the sealing, force and connections needed with a more simple structure. Surely elastomeric materials are available to provide the functions required.

SUMMARY OF THE INVENTION

The present invention provides an elastomeric body sealed about a rod and to the vessel wall. The body is confined by a fixture to generate a reactive force on the rod at the point where the rod extends through the vessel wall. The body therefore is positioned to energize a seal about the rod and to the vessel and a force directed to oppose displacement of the rod from within the vessel.

The invention further provides the elastomeric body shaped and arranged to isolate the rod from direct contact with the vessel while the rod moves through its normal range of positions. Further, the rod and vessel wall are arranged for direct engagement should the body be destroyed by some agent such as fire.

Other objects, advantages and features of the invention will become apparent to one skilled in the art upon consideration of the written specification, appended claims, and accompanying drawings.

DRAWING DESCRIPTION

DESCRIPTION OF THE PREFERRED EMBODIMENT

Figure 1:
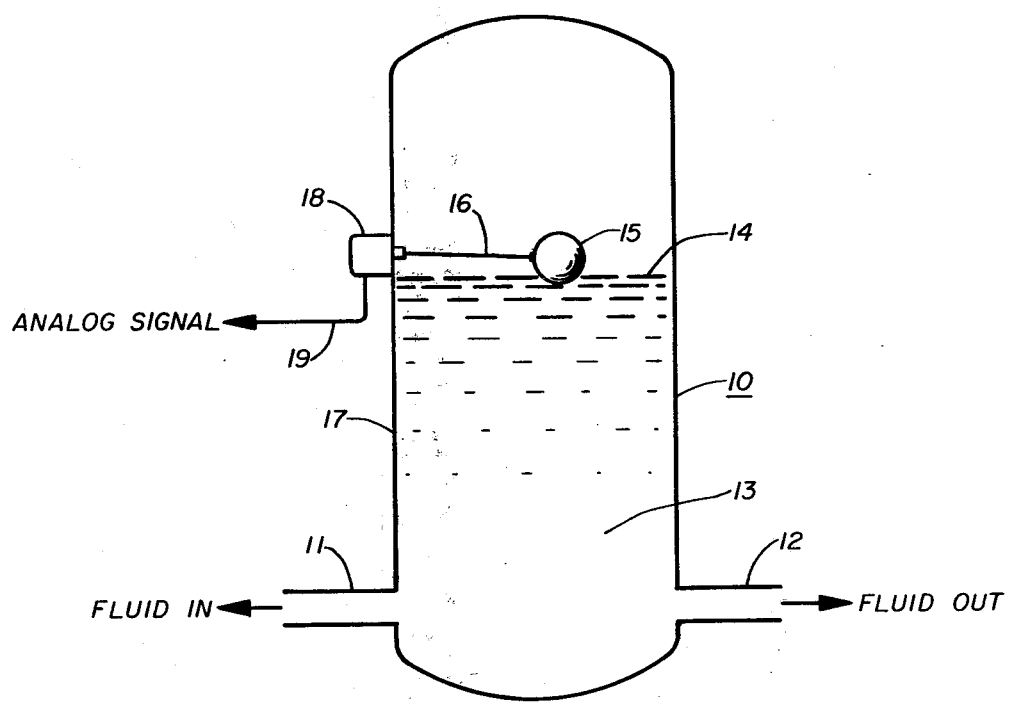
FIG. 1 is an elevation of a liquid reservoir in which the liquid level is sensed by an instrument embodying the present invention.

This invention is quite simple. However some of its features may be looked upon as subtle. To keep the disclosure as simple and straightforward as possible, the nomenclature must be consistent.

When speaking of an elastomeric body, the terms "rubber" and "rubber-like" spring to mind. Many compositions are grouped under the term, and the present disclosure includes those compositions which are distortable but are insignificantly compressible. Further, the distorted elastomeric material contemplated has a strong tendency to return to its original shape. Therefore, if the elastomer is bonded to independent members, the elastomeric body will develop a great force to return those bodies to their original positions relative to each other if one or the other is displaced.

The elastomeric body in the embodiment of the invention replaces tubular structure of the prior art. This substitution is a simplification in the art. At the same time, sealing is retained, a fulcrum for the positioned member is provided and a force is generated to return the displaced member toward its original position.

When speaking of the displaced member, the disclosure refers to an elongated rod. One end of this rod is connected to a primary element while the other end is connected to a signal generator. The primary element may be no more than a float, or displacer. The signal generator may be one of the many available gas-powered relays. The rod may do no more than move a flapper relative to the control nozzle of this relay.

The rod is disclosed as an elongated rod pivoted over a fulcrum. The rod is also described as "positioned" by the primary element connected to one end of the rod. This description is expected to cover rotation as well as pivoting of the rod. Rotated, the rod transmits torque. The invention accommodates both types of movement. Both forms of movement are transmitted through the elastomeric body which, in all cases, seals the container and exerts a force to return the displaced transmitting rod to its original position.

The primary element is perhaps a float, or displacer, in most cases. But aside from the form of primary element, the variable which positions the element must be understood.

If there is a float, there is liquid. But there are granular materials which must be regarded as acting in a fluid-like manner. For the present disclosure, the primary element will be broadly described as displaced by "material". Further, the primary element is described as displaced by material as it accumulates. In this way the displacement in position is related to variable quantities of the material sensed. All of this elementary description should be readily understood by those skilled in the art, but it is better to be clear at the outset of disclosure of a simple invention of this nature.

Having discussed the elastomeric body, the primary element, the analog signal generator, the link between the generator and primary element and the material sensed by the system, it is well to discuss the locus of these structures. In a word, the locus is a tank.

Broadly a tank is a container. Taking liquid as a fair representation of the material, the disclosure is made of a tank, vessel, or container through which liquid is passed.

With liquid accumulating in and discharged from the container, the present embodiment is mounted in, through or on the wall of the container to sense the level of liquid in the container as a variable.

The output of the generator may be used to no more than display, or indicate, the level. Even more simply, the analog signal may be applied to do no more than indicate deviation of the level from one fixed value. If the primary element is positioned up or down from its predetermined height, the signal generator will establish an output to index this departure. While the embodiment of the invention carries out this age-old function, the invention keeps the wall of the container sealed and exerts the force to urge the return of the primary element to its neutral, base or position predetermined to be satisfactory. Of course, it is to be understood that the signal of the generator could be applied to a valve, pump, etc. which could regulate the flow of liquid in or out of the container to return the level to a satisfactory height.

The foregoing practically describes FIG. 1 of the drawings. container 10 is supplied liquid through inlet 11. Liquid is removed through outlet 12. No source of liquid supply, or control over it, is necessary. The liquid 13 is simply shown to form a level 14. Primary element 15 is shown in contact with level 14. Rod 16 connects to float 15 by one end. The other end of rod 16 extends through wall 17 of the container to connect to, and actuate, the signal generator 18 which is mounted on the outside of wall 17. The manifesting signal output of generator 18 is established in 19 and may be used to simply indicate level position on a gauge or be applied to a pump, valve, etc. in conduit 11 or conduit 12.

Figure 2:
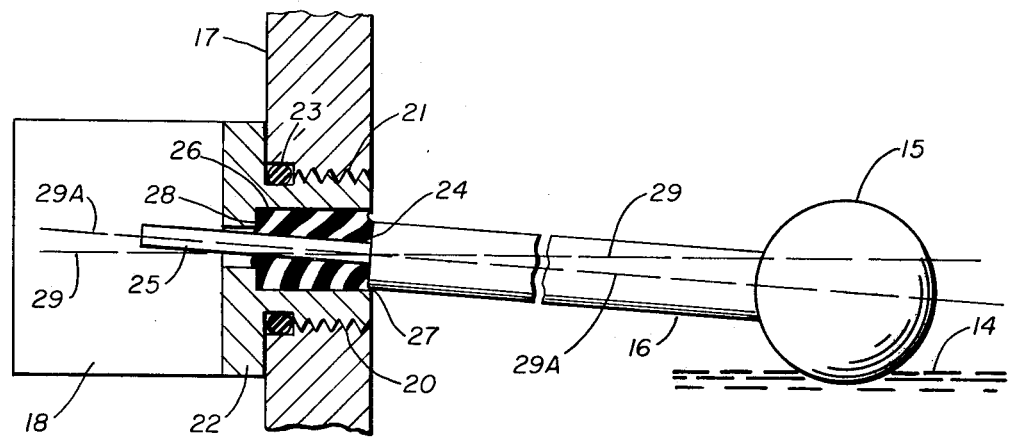
FIG. 2 is a sectioned elevation of the rod, bushing and elastomeric body of the FIG. 1 instrument.

In FIG. 2 the neutral, normal base position of rod 16, 25 is indicated by dashed line 29. Also in FIG. 2 the rod 16, 25 is shown distorting elastomeric body 27 as the weight of primary element 15 pivots rod 16, 25 downward across the centroid of the body as a fulcrum. Thus distortion of the body 27 can be discerned in FIG. 2 as the distortion generates the forces directed to return the rod 16, 25 from the position indicated by dashed line 29A to the position indicated by dashed line 29. Thus the end of rod portion 25 extending out of bushing 20 travels through the angle formed between lines 29 and 29A to actuate the mechanism of generator 18. FIG. 2 now discloses how an elastomeric body can replace the tube of the prior art with the benefit of simplicity and without loss of any function of the old combination.

It all begins with bushing 20. Bushing 20 is the base of the combination. Bushing 20 is mounted through the wall of the container.

Threaded at 21, flanged at 22 and sealed to the wall with O-ring 23 the bushing 20 becomes a part of the container wall. Rod 16 extends through the container wall 17. More specifically, rod 16 is reduced in diameter to form a shoulder 24, the reduced diameter portion 25 of rod 16 extends through bore 26 of bushing 20.

Reduced diameter rod portion 25 connects with the internal mechanism of generator 18 actuated in accordance with the movement of rod 16 and its portion 25. These rod portions have a neutral, normal, base position from which their motion takes place in accordance with the movement of the primary element 15 as it follows a variable condition such as level 14 of FIG. 1.

In FIG. 2, the elastomeric body 27 is disclosed in the form of a simple right cylinder, the left end against counterbore shoulder 28 of bushing 20 and the right end against rod soulder 24.

Rod 16 fulcrums on the centroid of elastomeric body 27 as float 15 is moved vertically by variable level 14. As rod 16 pivots on its fulcrum, distortion of elastomeric body 27 takes place, setting up stresses which exert force on rod 16 directed to return it to the position shown in FIG. 2.

Inventive Scope

FIG. 1 enables us to examine the invention in terms of specific structure which embodies the invention. In a broad sense, FIG. 2 discloses position responsive structure. The primary element moves and therefore moves rod 16. Signal device 18 is moved by rod 16. All of these elements are mounted on wall 17 of vessel 10.

Bushing 20 is, broadly, a fixture mounted to a part of wall 17 through which the rod 16 extends. Finally the elastomeric body 27 is arranged about the rod and within the fixture. The deformable body is held between the counterbore shoulder 28 and shoulder 24. The body is thereby contained, or captured, about the rod 16, more specifically, about its reduced portion 25. The body is compressed, or, at least a compressive force is applied by the fixture to the body. This force develops a seal with the fixture and the reduced portion 25 to effectively seal the bore through the bushing.

While deforming the body continues to provide a fulcrum across which rod 16 pivots to transmit position changes of float 15.

Additionally, body 27 can be bonded to the surface of rod 16 and the fixture surface. This bond will be an additional sealing structure of body 27 during any type of movement of rod 16, be it up and down or rotational. However positioned, rod 16 has the force generated by distortion of body 27 applied in the direction to urge return of rod 16 to its original position.

Destruction of the Elastomeric Body

What if the body of elastomeric material disappears? A fire could take place and the body be partially destroyed. The loss of sealing for the vessel could result in serious waste if not a large hazard.

A back-up seal should be provided. Obviously the secondary, or stand-by, seal need not function until the body has been at least partially removed.

Figure 3:
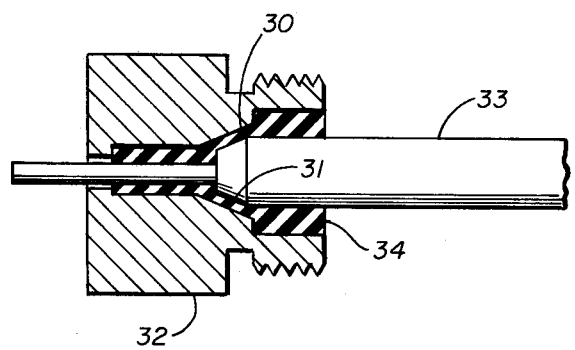
FIG. 3 is a sectioned elevation of a different form of FIG. 2 structure.

FIG. 3 is the first disclosure of structure to carry out the secondary sealing. Essentially, surfaces are provided on the bushing and rod which will come together when the elastomeric body between the surfaces is removed. In FIG. 3, these surfaces are conical surface 30 on the bushing and surface 31 on the rod. The metal-to-metal engagement of these surfaces may not be a complete seal. But such a seal could well be adequate for the period of emergency expected.

In FIG. 3, the environment for surfaces 30 and 31 is familiar. A bushing 32 is threaded into a hole of a vessel wall. Rod 33 is comparable to rod 16 of FIGS. 1 and 2. Essentially the basic difference between FIGS. 2 and 3 is that the shoulder 31, formed by the reduced diameter of rod 33, is given a conical shape, and the counterbore shoulder in the bore of bushing 32 is given the matching conical shape. Of course, the shoulder surface 31 of rod 33 is moved inside the bore of the bushing 32. This demands the elastomeric body 34 be sized to extend over the larger diameter portion of rod 33 and down between the surfaces 30, 31. The body 34 can even extend further over the reduced diameter section of rod 33.

In all events, it can be declared, from this arrangement disclosed, that if the body portion between surfaces 30, 31 is removed, the surfaces will be forced into engagement by vessel pressure moving rod 33 outward, through the bushing bore.

Figure 4:
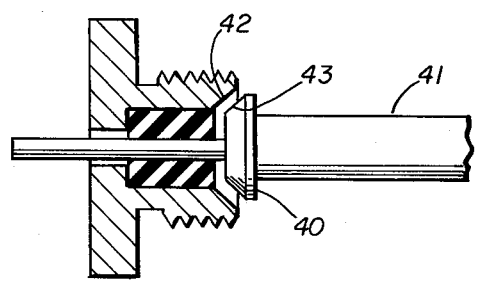
FIG. 4 is a variation of the structure of FIG. 3.

FIG. 4 provides a secondary seal which is alternate to the arrangement of FIG. 3. The metal-to-metal seats are arranged in the end of the bushing bore. Essentially, the structure is provided by a flange 40 on the rod 41 and a seat surface 42 at the entrance to the bushing bore.

Failure of the elastomeric body will cause these parts to come together in a seal.

Both surface 42 and surface 43 on flange 40 are preferably of conical shape. Bringing these surface shapes together gives a welding engagement which is more effective than just the mating of parallel surfaces.

Torque

Figure 5:
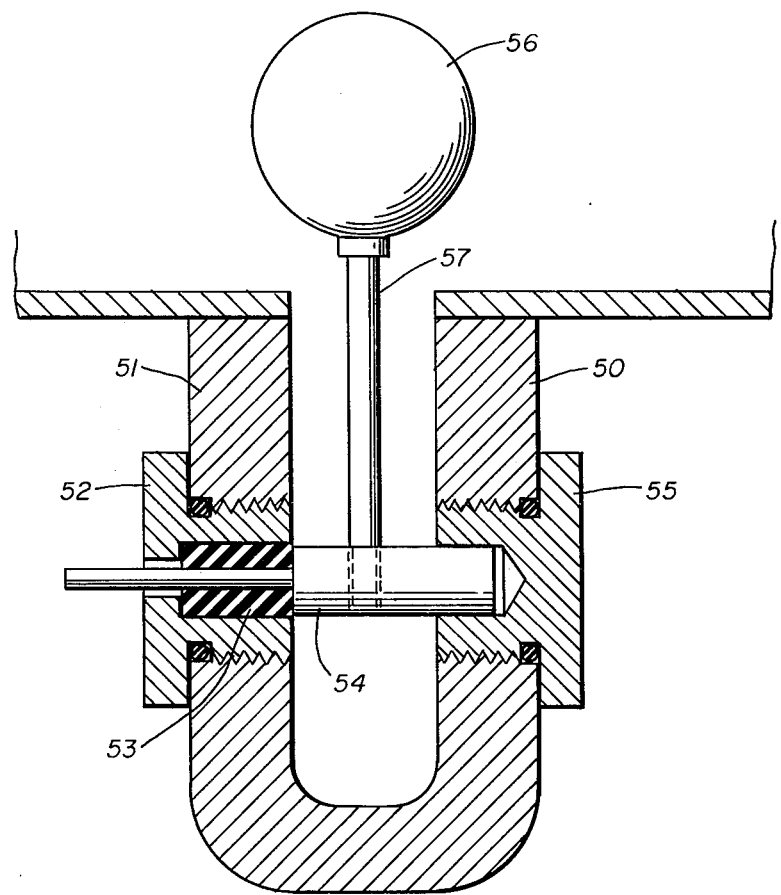
FIG. 5 is a sectioned plan view of an instrument in which the elastomeric body is under the stress of torque.

So for, the disclosure has only indicated that the variable condition has caused the rod to move up and down over its fulcrum. However, the invention has the scope to accommodate rotational movement of the rod. FIG. 5 discloses clearly how torque is transmitted through the elastomeric body to establish analog signals representative of primary element position.

The sectioned plan view of FIG. 5 discloses an extension of vessel 50 with a wall 51. As in the preceding drawings, a bushing 52 is mounted in a hole through the wall 51. The bushing 52 is formed after the manner of the bushing of FIG. 2 in that the shoulder of the internal counterbore abuts one end of the elastomeric body 53. The other end of the body is against the shoulder formed by reducing the diameter of rod 54.

The basic difference between the function of the elastomeric bodies of the prior disclosure and 53 is that body 53 is subjected to the stress of torque as rod 54 rotates. Rod 54 may, or may not, be supplied with a bearing at 55. In either event, primary element float 56 is linked to rod 54 by rod 57. The vertical movement of float 56 is thereby translated into rotational movement of rod 54. The rotational movement of rod 54 actuates a signal generated in any well known manner. The basic disclosure is that movement is transmitted across wall 51 while body 53 seals the vessel 50 and exerts a "return force" on the linkage to float 56.

The invention, having been described, what is claimed is:

1. Linkage between a displacement element and a signal generator for an analogue of the position of the element, including,
   a primary element adapted to be positioned within a range by a variable condition in a container,
   an elongated rod member connected by one end to the displaced primary element and extending the second end through the wall of the container,
   a device mounted on the outside of the container and to the end of the rod to generate signals which are analogues of the displacer positions and which manifest and/or control the variable condition in the container,
   a reduced diameter portion formed on the rod at the wall of the container,
   a cylindrical body of elastomeric material arranged about the reduced diameter portion of the rod, one end abutting the rod shoulder formed by the reduced diameter,
   a bushing extended through the container wall and having a passage through which the reduced diameter of the rod extends,
   and a counterbore in the bushing which provides a shoulder which engages the second end of the cylindrical elastomeric body, whereby the elastomeric body deforms to provide a fulcrum at its centroid for the rod in establishing a range of positions for each end of the rod and a force directed to returning the rod to its original position.

2. The linkage of claim 1, wherein, the shoulders of the rod and the bushing are provided a conical shape which mate when engaged,
   and the elastomeric body is entended form between the concentric surface of the rod and internal wall of the bushing to between the conical surfaces of the shoulders, p1 whereby destruction of the body and its sealing function will enable the conical shoulders to contact and provide a secondary seal for the bushing passage between the interior and exterior of the container.

3. The linkage of claim 1, including,
   a seal member mounted about the rod within the container and providing a sealing surface spaced form a bushing surface about the bushing passage, the surface engaging upon failure of the elastomeric body and thereby forming a secondary seal of the container at the bushing.

4. A position responsive structure having an element moved by a variable condition and linked to a signal device which establishes an output analogue signal representative of the positions of the element, including,
   a vessel,
   a supply of material connected to the vessel to accumulate material within the vessel,
   a primary element arranged to be directly contacted by the material in the vessel and moved by the material to positions within a predetermined range by the accumulation of the material,
   an elongated rod connected by one of its ends to the primary element and arranged to extend its other end to a position external the vessel,
   a signal device connected to the external end of the rod for actuation by the rod as the rod is moved by the primary element,
   a body formed of an elastomeric material about the rod and between the rod and vessel wall,
   and a fixture about the elastomeric body formed by a counterbore in the vessel wall and from within the vessel and a shoulder formed on the rod facing toward the outside of the vessel.

* * * * *